United States Patent [19]
Gregory

[11] 3,836,184
[45] Sept. 17, 1974

[54] PIPE COUPLING

[76] Inventor: Frank Gregory, 6620 Woodchuck Hill Rd., Jamesville, N.Y. 13078

[22] Filed: Apr. 26, 1972

[21] Appl. No.: 235,534

Related U.S. Application Data

[63] Continuation-in-part of Ser. No. 147,975, May 28, 1971, abandoned.

[52] U.S. Cl. ............... 285/417, 285/39, 285/420
[51] Int. Cl. ............................................ F16l 21/06
[58] Field of Search .......... 285/322, 236, 419, 365, 285/417, 39, 418, 373, 420; 403/396, 290, 392; 24/20 R, 256, 20 EG, 20 TT

[56] References Cited
UNITED STATES PATENTS

| | | | |
|---|---|---|---|
| 2,702,716 | 2/1955 | Basolo et al. | 285/322 |
| 2,811,274 | 10/1957 | Wilson | 285/351 X |
| 3,178,208 | 4/1965 | Koehler | 285/322 |
| 3,474,519 | 10/1969 | Hallesy | 285/382 UX |
| 3,537,147 | 11/1970 | Pfeuffer | 285/420 X |

Assistant Examiner—Wayne L. Shedd
Attorney, Agent, or Firm—Gardiner, Sixbey, Bradford & Carlson

[57] ABSTRACT

A pipe coupling assembly for securing together the ends of pipes, for the purpose of allowing an uninterrupted flow of fluid therebetween, whereby a flexible circular band is combined with a ring-shaped clip or another band to provide a clamp which is fitted around a pair of pipe ends. In one embodiment, the band is combined with a ring-shaped clip and the ends of the clip are twisted and locked together thereby exerting pressure directed radially inward around the circumference of the band such that the band grips both pipes, thus securing the pipe ends tightly together. In another embodiment, an outer band has shoulders which can be gripped with a pair of pliers and drawn together with the clamp being secured by detent action between an interior band and the exterior band or a ring-shaped clip. Alternatively, the band may be formed integrally with one pipe end and adapted to fit around the other pipe end.

11 Claims, 21 Drawing Figures

PATENTED SEP 17 1974 3,836,184

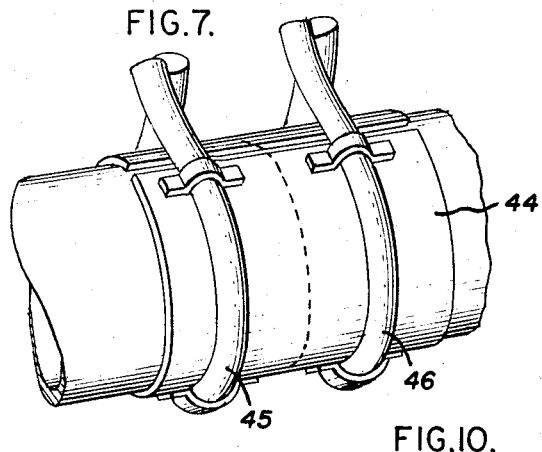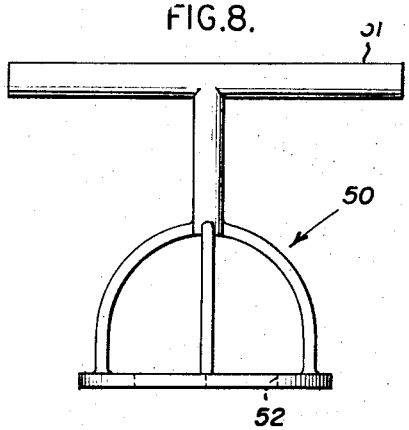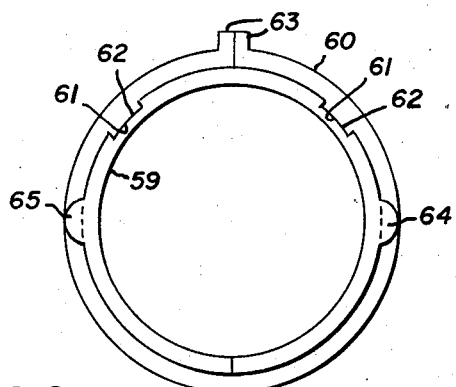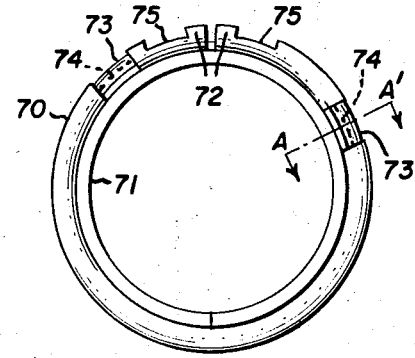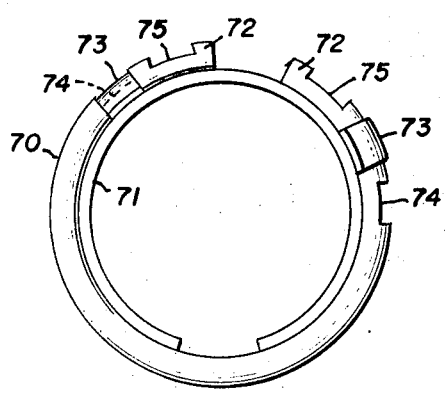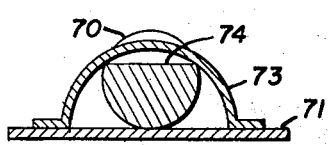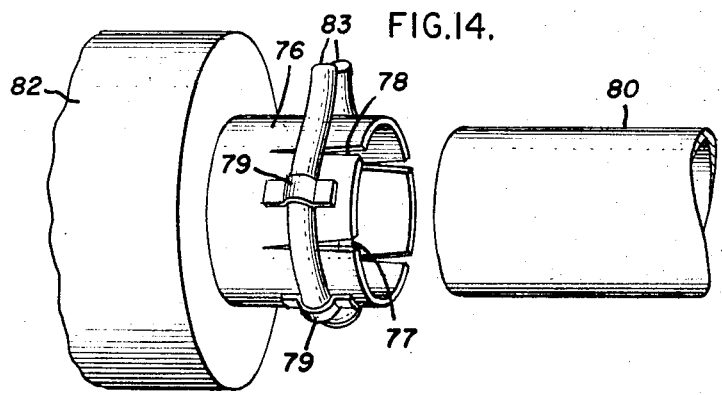

PIPE COUPLING

CROSS-REFERENCES TO RELATED APPLICATIONS

This is a continuation-in-part of my application Ser. No. 147,975, filed May 28, 1971, now abandoned.

BACKGROUND OF THE INVENTION

The invention relates to pipe coupling assemblies which are employed for the purpose of forming a mechanical connection permitting uninterrupted flow between a pair of pipe ends by tightly securing the pipe ends together. The coupling assemblies of this class usually include a circular-shaped band member or ring clip which is adapted to be wrapped around the ends of pipes to be joined. Pressure is then circumferentially applied to the pipe ends by either the natural spring force of the band or clip or, alternatively, may be effected by the use of a tightening mechanism which serves to expand and contract the band or ring. In either case, the applied pressure causes the band or ring clip to tightly grip the ends of the pipes to form a mechanical or threadless joint.

The characteristics of such pipe couplings and clamps can best be exemplified by some reference to the prior art. In the first category, for example, the Coldren U.S. Pat. No. 2,874,430 and Gildone U.S. Pat. No. 3,317,966 both teach pipe or hose clamps in the form of ring clips which depend upon inherent spring tension within the clips themselves for effecting the clamping action. It is apparent that the clips or couplings of this latter category are only feasible for use with flexible hoses and the like, where there would be little chance of externally or internally applied forces of a magnitude that would otherwise disrupt the joint so formed.

Examples of mechanical pipe couplings of the second category are well shown by the Damsel U.S. Pat. No. 1,967,467 and Decker U.S. Pat. No. 3,520,503. These couplings consist of a bandlike member which is wrapped around the ends of the pipes and circumferentially tightened therearound by an independent mechanism. Damsel's mechanism is in the form of nut and bolt assemblies while Decker employs a strap and locking hasp combination. While the coupling assemblies of this category necessarily provide a much stronger clamping action than the spring-tensioned clips discussed above, their main disadvantages lie in their mechanical complexity and expense in manufacturing. The former disadvantage is even further aggravated when such couplings are employed under conditions whereby rust, corrosion, chemicals or debris would cause the tightening mechanism to lock or jam, thereby making a quick removal of the coupling difficult if not impossible. An excellent example of such condition is the environment found within and around the pipe connections of automobile exhaust systems.

In view of the above, it is apparent that the prior art fails to teach a mechanical pipe coupling assembly which is both economical to manufacture and simple in operation, and which serves to form a satisfactory joint notwithstanding the physical nature of the pipes to be joined or the operating conditions to which they are subjected.

SUMMARY OF THE INVENTION

The pipe coupling assembly of the present invention serves to overcome the limitations and disadvantages of the prior art couplings since it is not only economical to manufacture and simple in construction, but it also provides an easily operated means of forming or disassembling a pipe joint. To achieve these advantages, the coupling assembly of this invention comprises a circular band member, which may or may not be continuous, that is adapted to be fitted in wrap-around fashion about the pipe ends to be joined together. In one embodiment, loops or guides are circumferentially provided around the outer periphery of the band for securing and guiding a discontinuous circular wire ring clip or gripping member. The ends of the latter member are bent into hooklike forms which cooperatively engage and interlock with each other. This interlocking action may be achieved by a perforated tool member which receives the free ends of the wire ring within its slotted perforation and, upon rotation of the member about the free ends of the wire ring, the ends of the clip or gripping member are caused to engage and interlock with each other. The interlocking action tends to shrink the effective diameter of the open ring, thereby imparting a pressure directed radially inward around the band member which consequently compresses circumferentially around the pipe ends, thereby gripping them securely to hold them together.

In a second embodiment, the interior band is combined with an outer band or ring. The ends of the interior band are situated approximately diametrically opposite the respective ends of the exterior band or ring. The ends of the exterior band or ring are shaped so that they can be readily grasped by pliers when the ends of the exterior band or ring are to be brought together. When the ends of the exterior band or ring are brought together, the circumference of the exterior band or ring is reduced, imparting a radially inward pressure around the interior band, which thereupon grips the pipe ends. The clamp in this embodiment is secured in the locked position by interaction between the exterior ring or band and the interior band which, in one form, is achieved by use of detents, or mating protrusions and indentations between the exterior and interior bands.

In another form of the second embodiment, the outer member is a ring-shaped clip rather than a band. In this configuration, the interior band contains loops which overlie the ring clip encircling the interior band. The loops relate to indentation on the exterior of the overlying ring clip such that, when the ends of the ring-shaped clip are drawn together, the overlying loops or shoulders slip into these indentations.

In each of the above described embodiments, the interior band member is a separate element of the clamp. In another embodiment, the interior band member is formed integrally with one of the pipe ends and is adapted to fit around the other pipe end; that is, one of the pipe ends to be joined serves as the interior band member in that it contains notches permitting it to contract about the other pipe end when radially-inwardly directed pressure is applied. Such pressure can be applied using any of the concepts presented in the embodiments set forth above. Thus the notched pipe end may contain loops or guides to hold the ring employed in the first embodiment, allowing the pipe end to be constricted by interlocking action between the ring ends. The notched pipe end can also be held in a "locked" position by detent action between the pipe end and the overlying ring or band means, similar to that employed in the second embodiment. Such detent action can be provided by interaction between the exterior surface of the notched pipe end and the interior surface of the band encircling means, or between loops provided about the notched pipe end that are shaped and located so as to fit into mating recesses or indentations in the band encircling means.

A particularly useful application of this latter embodiment is with regard to an automobile exhaust assembly. An automotive muffler typically includes a short section of pipe protruding from the rear into which the front end of the tail pipe is inserted to form a joint. The invention contemplates notches formed in the rear of the short section of pipe protruding from the muffler. This section of pipe is fitted about the front end of the tail pipe and is secured thereto by any of the means described above.

It is, therefore, an object of this invention to provide a pipe coupling assembly which is economical to manufacture and simple in both construction and manner of use.

It is another object to provide a pipe coupling assembly capable of being quickly locked onto, or released from, the ends of a pair of pipes.

It is another object of the invention to provide a pipe coupling assembly which will securely grip the ends of a pair of pipes and hold them even when subjected to high, longitudinally opposed tensile forces.

It is another object of the invention to provide a pipe coupling assembly formed integrally with one end of a pipe and adapted to securely grip the end of another pipe and hold it even when the pipes are subjected to opposing tensile forces.

It is another object to provide an automotive muffler carrying a self-contained clamp for attachment to a tail pipe.

It is a further object of this invention to provide a pipe joint which may be quickly disassembled with minimal effort regardless of the degree of pipe corrosion within the joint.

It is still a further object of this invention to provide a pipe coupling capable of forming secure joints for interconnecting different pipes made from dissimilar materials and having a variety of different uses.

DESCRIPTION OF THE DRAWINGS

These and other objects and advantages and the manner of attaining them are described below with reference to embodiments of the invention as shown in the accompanying drawings, wherein:

FIG. 7 is a perspective representation of still another form of the first embodiment utilizing two rings, one at each end of the bands;

FIG. 8 is a side view of a tool designed to readily interlock and unfasten the ends of the ring used in the first embodiment;

FIG. 9 is a perspective view of the lower portion of the tool depicted in FIG. 8;

FIG. 10 is a side view of one form of the second embodiment, utilizing two bands;

FIG. 11 is a side view of another form of the second embodiment encompassing the combination of a band and an overlying ring in a "closed" position;

FIG. 12 is a side view of the form of embodiment depicted in FIG. 11, shown in an "open" position;

FIG. 13 is a sectional view along lines A—A' of FIG. 11 showing the relative position of the overlying band or loop when the clamp is in a "closed" position.

FIG. 14 is a perspective view of the rear end of an automotive muffler with a short section of pipe protruding therefrom having a notched end and being equipped with an overlying ring and guide means therefor.

DETAILED DESCRIPTION OF THE INVENTION

Figure 2:
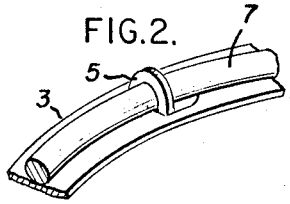
FIG. 2 is a partial perspective representation of one type of guide means.
Figure 3:
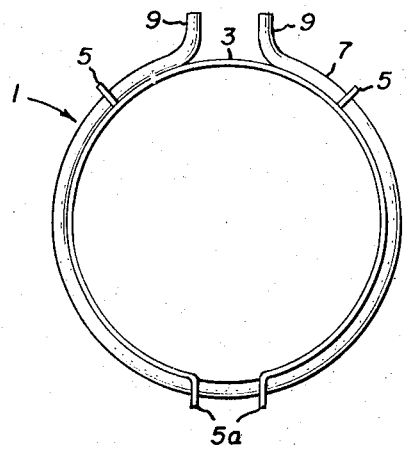
FIG. 3 is a front elevational view of the one form of the first embodiment of the invention.

Referring first to FIGS. 2 and 3, there is depicted a pipe coupling assembly 1 as employed in the first embodiment of the present invention. As seen, the assembly 1 comprises a discontinuous band means or member 3 of steel or similar material and having a generally circular shape. The ends of the member 3 are bent outwardly to form flanges which, in turn, are perforated to form a pair of end guide means 5a. As evident from FIG. 2, additional guide means 5 may also be formed around the periphery of member 3 by stamping out semicircular-shaped shoulder sections in the member 3 itself. A flexible, spring steel locking means in the form of a clip or ring 7 having a corresponding circular shape is secured around band member 3 by passing through the series of guide means 5 and 5a. The ends 9 of the ring 7 are bent outwardly, so as to extend outside the periphery of the ring, and terminate adjacent each other at a point in the circular assembly approximately diametrically opposite the adjacent free ends 5a of the band member 3. The ends 9 of ring 7 are of a hook-like configuration such that they may be twisted around each other and interlocked securely. In each form of the first embodiment described above, the ring member 7 is held in relation to the band member 3 by loops or guide means overlying the ring or locking means 7. Alternatively, the ring or locking means may be held in relation to the band means by ridges, or other protrusions, formed in or upon the band means.

Figure 1:
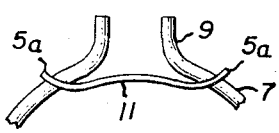
FIG. 1 is a partial front view of one form of the first embodiment of the invention.

FIG. 1 depicts a partial front view of another form of this embodiment of the invention wherein the hook ends 9 of ring 7 are secured through guide means 5a of a shorter band member 11. It can be seen that the band member 11 has an arcuate configuration of any desired magnitude though preferably of approximately 35 to 45 degrees of a complete circle.

Figure 4A:
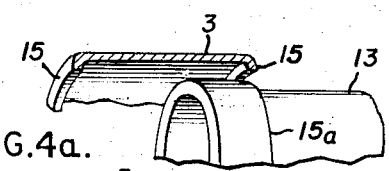
FIGS. 4a – 4e are partial perspective representations of various structural relationships between the band member of the invention and a pipe end to be clamped.
Figure 4B:
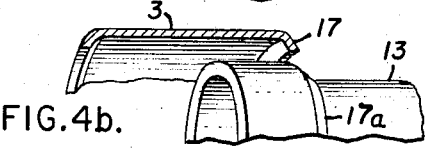
Figure 4C:
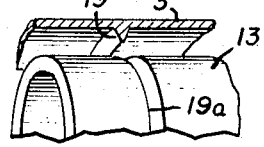
Figure 4D:
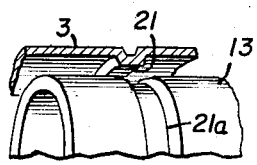
Figure 4E:
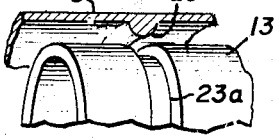

Referring now to FIGS. 4a – 4e, there are depicted various cross-sectional shapes for the band member 3. It can be seen in all cases that band member 3 is provided with an inwardly directed flange or projection for cooperation with a flange or annular groove formed in the pipe end 13. This provides additional resistance to separation where the pipes are subjected to high, longitudinally opposed, tensile forces. FIG. 4a shows the band member 3 with right angle peripheral projections or flanges 15 which are adapted to abut the flange 15a formed on the pipe end 13. The flanges 17 of the FIG. 4b configuration are similar to the flanges 15 of FIG. 4a except that they are flared outwardly to cooperate with a pipe end having a mating flange configuration 17a. FIGS. 4c – 4e all depict band members 3 with inwardly directed projections which are located within the member's peripheral edges. Projection 19 has a triangular cross-sectional shape for cooperation with a pipe end 13 having a mating triangular-shaped annular recess 19a. Similarly, FIG. 4d depicts a rectangular-shaped projection 21 and FIG. 4e depicts a semicircular shaped projection 23 for cooperation with pipe ends having mating recesses 21a and 23a, respectively. While FIGS. 4a – 4e show the cooperation of the band member 3 with a single pipe end 13, it is understood that such is only a partial representation since the band member 3 extends to secure two similar pipe ends together for the formation of a pipe joint. Moreover, the interior surface of the band member can be knurled, roughened, or textured in some other form (not shown) also to provide increased frictional resistance to separation where the pipes are subjected to high longitudinally opposed tensile forces.

Figure 5:
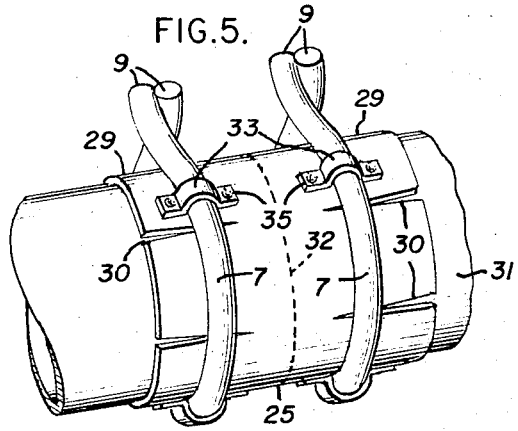
FIG. 5 is a perspective representation of another form of the first embodiment which utilizes two rings, one at each end of the band member.
Figure 6A:
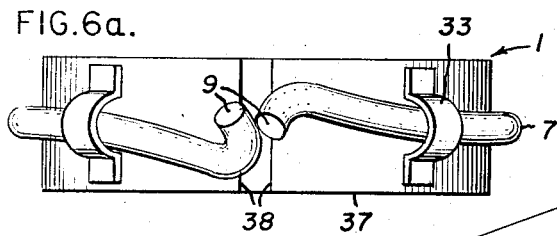
FIGS. 6a – 6d are successive top views of the assembling steps of the first embodiment of the invention.
Figure 6B:
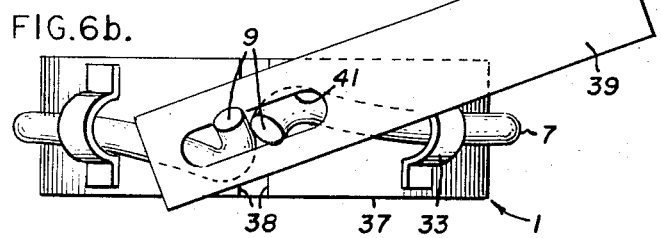
Figure 6C:
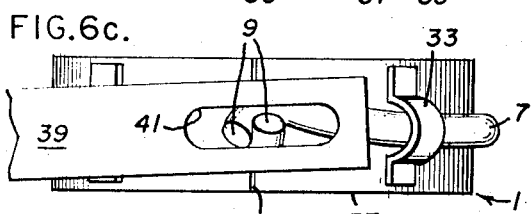
Figure 6D:
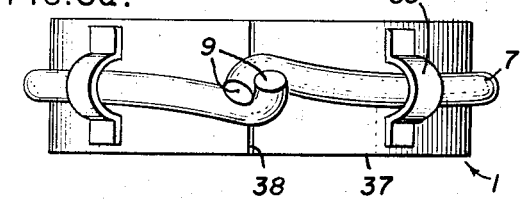

Another form of the first embodiment of this invention is shown in FIG. 5. The band member 25 is continuous in structure and is provided with a plurality of circumferentially spaced notches 30. When the pipes 31 are inserted into the band and the hook ends 9 of the rings 7 are interlocked together, the resulting pressure will serve to contract the band, closing the spaces in spaced notches 30 and thereby firmly gripping the pipe ends. Dotted line 32 shows the approximate termination of the left-hand pipe end.

FIGS. 6a – 6d successively depict a method of assembling the pipe coupling of this embodiment of the invention in order to form a pipe joint by securing the pipe ends (not shown) together. The band member 37 of the embodiment depicted by these figures is also discontinuous and circular in configuration but the ends 38 of which are not flanged, as in the FIGS. 2 and 3 embodiment. Also, it can be seen that the ends 38 of band member 37 are directly adjacent to the hook ends 9 of the ring clip 7. To effect the locking action of the coupling assembly around the pipe ends (not shown) to be joined together, an elongated tool means 39 having a slotted opening 41 at one end is provided. The opening 41 is placed over the hook ends 9. The other end of the tool may then be manually grasped and rotated about hook ends 9 in the direction shown by the arrow, such that a twisting action is applied to the hook ends 9 so that they may wrap around each other and interlock. A form of tool 50, different from tool means 39 but used for the same purpose, is shown in FIGS. 8 and 9, FIG. 8 being a side view of the tool showing handle 51 by which it is manually grasped, and FIG. 9 showing the lower portion of tool 50 illustrating opening 52 in the base of the tool designed to receive the ring ends.

When tool 39, or tool 50, as the case may be, is rotated, it is evident that the ring clip 7 will undergo a reduction in its effective diameter thereby applying pressure directed radially inward around the band member 37 such that it will correspondingly contract around the pipe ends. The ends 38 of the band 37 will thus close substantially together when the hook ends 9 of the ring clip 7 are finally completely interlocked. With the clip 7 in this interlocked condition, the coupling assembly 1 will serve to tightly grip the pipe ends so as to form a strong joint. The joint thus formed can be quickly disassembled by replacing the tool opening 41 or 52, as the case may be, over the hook ends 9 and rotating the tool in the reverse direction. By so doing, band 37 releases its grip on the pipe ends, even if the pipe ends should be rusted to the band, since ring clip 7 undergoes a restoration toward its original, larger diameter. The increase in diameter of clip 7 exerts a force on guide means 33, directed radially outward, thereby pulling band 37 away from the pipe surface. While specific tools have been described for the purpose of applying and removing the coupling assembly 1, it is to be understood that any other suitable tool or tools, such as a pair of pliers, may also be employed for the same purpose.

FIG. 7 shows another form of the first embodiment somewhat similar to that depicted in FIGS. 6a through 6d. This structure comprises a discontinuous band 44, but with a ring 45 and 46 near each respective end, so that each ring is situated about a separate, respective pipe end. This double ring form of embodiment may be operated in the same way as the form of embodiment shown in FIGS. 6a – 6d, using tool means 39 or tool 50 shown in FIGS. 8 and 9.

While the embodiment heretofore described relies upon interlocking action between the ends of the ring to maintain a radially-directed force about the pipe ends being coupled, the embodiment shown in FIGS. 10 – 13 achieves the same result through employment of an interlocking action between an inner band and band-encircling means such as an outer band (FIG. 10) or an outer ring (FIGS. 11 and 12).

The form of embodiment depicted in FIG. 10 comprises the combination of an inner metal band 59 fitting within and encircled by an outer band 60 with the ends of the bands located diametrically opposite each other. The outer band is shown in a closed position. In the unlocked position, the inner diameter of inner band 59 is slightly larger than the outer diameter of the items to be secured, and the relative sizes of the bands are such that inside band 59 tends to exert a radially-outward force around the outside band 60. Outside band 60 contains protrusions 61, each of which, when the bands are in a closed position, falls into a respective recess 62 in the interior band 59 thus holding the clamp in a closed or locked position. Thus each combination of a protrusion 61 and a recess 62 forms a respective detent for the concentric bands 59 and 60. The interior band has several "ears" 64 and 65 to hold the two bands in proper relationship to each other, it being understood, however, that interrelating ridges (not shown) in the center or at the edges of the bands would perform the same function. The ends of the exterior band 60 are flanged outward 63 so that they can be readily grasped and drawn together by pliers. A variation of this form of embodiment (not shown) can comprise a single, wide interior band with one narrower exterior band at each end capable of being positioned about a separate pipe end, respectively. It is also to be understood that while only one form of relating protrusion 61 and recess 62 is depicted, a plurality of shapes and locations (relative to the bands) are possible; moreover, if desired, a hole through one band might be used in place of the recess to interact with the protrusion on the other band.

Another alternative structure comprises an assembly in which the interior and exterior bands contain but one set of mating protrusions and recesses, the bands otherwise being loosely affixed to each other by permanent bonding at one point. For example, the clamp of FIG. 10 would contain only one protrusion and recess and the bands would be permanently bonded at some point such as where the other interrelating protrusion and recess is depicted.

It is apparent that the embodiment of FIG. 10 can readily be made adjustable. To achieve this result, the interior band is formed through less than 360° of an arc. The exterior band, being wider than the interior band, overlaps both sides of the interior band so that the inside of the portion of the exterior band extending beyond the edge of the interior band is on a common cylindrical surface with the inside of the interior band. The bands are provided with more than one set of mating projections and holes or indentations, allowing the interior size of the clamp to be readily adjusted by selection of a different set of mating projections and indentations or holes. Because the bands are shaped as described above, the shape of the interior of the clamp is essentially a true circle.

When the configuration described in the preceeding paragraph or any configuration of the embodiment depicted in FIG. 10 is used to join the ends of hoses or other flexible pipes, it can be combined with an interior support for the pipes, for example a hollow cylindrical tube, the exterior diameter of which is approximately the same as the interior diameter of the ends of the pipes to be joined. A leak proof joint can be formed by inserting the tube into the ends of the pipe, and installing and closing the clamp, thus providing inward pressure on the pipe ends.

Another form of the second embodiment of the invention is depicted in FIGS. 11 and 12. This form comprises the combination of an outer ring 70 with an interior band 71, with FIG. 11 showing the combination in a closed position and FIG. 12 showing it in the unfastened position.

The ring and band are fashioned so that in the unfastened position their inner diameters are larger than the outer diameter of the items to be secured. The interior band 71 has fastened to it (or stamped from it) two loops 73 which overlie the ring 70 and exert radially-inward pressure on the exterior of ring 70. Ring 70 contains two indentations 74 which are so located that when the ends 72 of the ring are drawn together the loops 73 slip into the indentations in the ring. Indentations 74 and loops 73 thus comprise detent means which holds the clamp in a closed or locked position. FIG. 13 is a sectional view showing the interrelationship between the overlying loop 73 and the indentation 74 in ring 70. As indicated with regard to the structure depicted in FIG. 10, ring 70 and interior band 71 may be permanently bonded at one point, supplanting one of the two combinations of the overlying loop 73 and the recess 74 in the ring 70.

Further, interior band 59, shown in FIG. 10, and interior band 71, shown in FIGS. 11 and 12, may, alternatively, contain the various forms of inwardly directed projections or flanges for cooperating with respective flanges or annular grooves in the pipe ends, such as depicted with respect to the band means of the embodiment shown in FIGS. 4a through 4e. In addition, and as described with respect to the band means of the other embodiment, the inner band 59 and inner band 71 of FIGS. 10, 11 and 12 can be knurled, roughened or textured in some form (not shown) to provide increased frictional resistance to separation when the pipes are subjected to high longitudinally opposed tensile forces.

It is also to be understood with respect to the form of the second embodiment depicted in FIGS. 11 and 12 that many types of band encircling means (such as a semicircular ring) can be utilized in place of the annular ring depicted and that, dependent upon the shape of the ring, the overlying loops 73 may be of a different configuration from that depicted in FIG. 13.

The method of fastening the form of the second embodiment may be understood by considering FIGS. 11, 12 and 13. FIG. 12 shows this form of the second embodiment in its open position, with one of the two loops 73 resting within one of the two indentations 74 on ring 70 designed to receive the loops. The ring ends 72 are grasped by pliers and drawn together. As the ring ends 72 closely approach each other, the ends of the interior band 71 also approach each other and the other of the two loops 73 slips within the second of the two indentations 74 on the ring 70, thus holding the clamp in the closed position.

Referring to FIG. 13, the clamp may be opened by applying pressure to the exterior of one of loops 73 by gripping the loop at either end thereof with pliers so as to squeeze the loop. The resultant pressure deforms the loop, serving to lift the loop out of the indentation in ring 70, allowing ring 70 and band 71 to return to their open positions and thus permit ready removal of pipe ends that had previously been coupled by the clamp.

The method of operation of the clamp illustrated in FIG. 10 is similar in part to that of the clamp illustrated in FIGS. 11 – 13. In the open position, one of protrusions 61 is outside its mating indentation 62, and the ends of both the interior band 59 and exterior band 60 are apart. The ends 63 of exterior band 60 are grasped with pliers and drawn together. As the ends 63 of exterior band 60 closely approach each other, the ends of the interior band are drawn together also and the one protrusion 61 slips into its mating indentation. The resulting detent action thus holds bands 59 and 60 in relation to each other so as to hold the clamp in a closed position. The clamp is unlocked by inserting the end of a screwdriver between interior band 59 and exterior band 60 at a point close to one of the detents or mating protrusions. By twisting the screwdriver, the bands are separated, allowing them to return to their normal open position thus permitting ready removal of pipe ends that had previously been coupled by the clamp. The edges of the interior band 59 and exterior band 60 may be slightly flanged at a point close to one of the detents or mating protrusions so as to facilitate insertion of the end of a screwdriver.

FIG. 14, depicting the rear, or exhaust, end of an automotive muffler 82 and front end of a tail pipe 80, shows one form of another embodiment of the invention wherein pipe end 76, protruding from muffler 80 and intended to be joined to tail pipe 80, contains notches 77 and an overlying ring means 78. Pipe end 76 of muffler 82 is equipped with loops or guides 79 to hold ring means 78 in predetermined relation to it.

With ring means 78 in its open condition, the interior diameter of the muffler pipe 76 is greater than the exterior diameter of the end of tail pipe 80 to which it is to be secured. After the end of tail pipe 80 has been inserted into the end of muffler pipe 76, the flanged ends 83 of ring 78 are interlocked, constricting the end of muffler pipe 76 so as to fasten it securely around the end of the tail pipe 80.

Muffler pipe 76 has a natural tendency to become separated from the end of the tail pipe when the ends 83 of ring 78 end are unfastened. This is a result of ring 78 expanding in diameter when unlocked. This expansion produces a radially-outwardly directed force on the loops or guides 79 which tends to readily separate muffler pipe 76 from the end of the tail pipe 80.

It is to be understood that muffler pipe 76 can, in the alternative, be constricted and secured around the end of tail pipe 80 by means of detent action between the band encircling means surrounding muffler pipe 76 and the muffler pipe itself. This detent action can be achieved in the same manner as previously described with respect to the various forms of the second embodiment of this invention.

While the invention has been described with reference to specific embodiments, various modifications will be apparent to those skilled in the art, and it is to be understood that such modifications can be made without departing from the scope of the invention.

I claim:

1. A pipe clamp assembly for coupling together the ends of two pipes comprising compressible interior band means adapted to extend exteriorly around the end of each of said pipes, said interior band means being formed to compress inwardly from a first configuration in response to the application of external force thereto and to spring outwardly toward said first configuration as said external force is removed, a discontinuous outer band means adapted to extend substantially around the outside of said interior band means in contact therewith, the ends of said outer band means being spaced apart when said interior band means is in said first configuration, said outer band means being adapted to compress said interior band means inwardly from said first configuration to at least one compressed configuration when the ends thereof are drawn together to decrease the spacing therebetween, and detent means formed on said interior and outer band means to hold said interior band means in the compressed configuration, said detent means including mating members formed on said interior and outer band means positioned to engage when said interior band means is in the compressed configuration.

2. The pipe clamp assembly of claim 1 wherein said detent means constitute the sole means causing said outer band means to hold said interior band means in the compressed configuration.

3. The pipe clamp assembly of claim 1 wherein said mating members include at least one protrusion on one of said band means and a protrusion receiving structure on the remaining band means.

4. The pipe clamp assembly of claim 1 wherein said interior band means is discontinuous and includes two ends spaced apart when said interior band means is in said first configuration, the ends of said interior band means being moved toward one another as said interior band means is forced toward said compressed configuration.

5. The pipe clamp assembly of claim 4 which includes positioning means to position said interior band means relative to said outer band means, said positioning means operating to maintain the ends of said interior band means substantially diametrically opposite to the ends of said outer band means.

6. The pipe clamp assembly of claim 1 wherein the ends of said outer band means are flanged outwardly.

7. The pipe clamp assembly of claim 1 wherein said interior and outer band means are generally circular in configuration, said outer band means extending circumferentially around said inner band means.

8. The pipe clamp assembly of claim 4 wherein said interior and outer band means are joined together to position the ends of said interior band means substantially diametrically opposite to the ends of said outer band means.

9. The pipe clamp assembly of claim 7 wherein said detent means constitute the sole means for causing said outer band means to hold said interior band means in the compressed configuration, said detent means including a plurality of mating members, each of which includes a protrusion on one of said band means and a protrusion receiving structure on the remaining band means, said interior band means being discontinuous and including two ends spaced apart when said interior band means is in said first configuration, the ends of said interior band means being positioned substantially diametrically opposite to the ends of said outer band means, and the ends of said outer band means being flanged outwardly.

10. The pipe clamp assembly of claim 9 wherein each said protrusion includes a projecting loop formed on said interior band means and overlying said outer band means, said protrusion receiving structures constituting loop receiving indentations formed in the outer surface of said outer band means.

11. The pipe clamp assembly of claim 3 wherein said protrusion includes a projecting loop formed on said interior band means and overlying said outer band means, said protrusion receiving structure constituting loop receiving indentations formed in the outer surface of said outer band means.

* * * * *